(12) United States Patent
Massoudi

(10) Patent No.: US 9,178,785 B1
(45) Date of Patent: Nov. 3, 2015

(54) ACCOUNTING FOR USAGE AND USAGE-BASED PRICING OF RUNTIME ENGINE

(75) Inventor: Arash Massoudi, San Francisco, CA (US)

(73) Assignee: NextAxiom Technology, Inc, San Francisco, CA (US)

( * ) Notice: Subject to any disclaimer, the term of this patent is extended or adjusted under 35 U.S.C. 154(b) by 522 days.

(21) Appl. No.: 12/359,133

(22) Filed: Jan. 23, 2009

Related U.S. Application Data

(60) Provisional application No. 61/023,189, filed on Jan. 24, 2008.

(51) Int. Cl.
G06F 15/173 (2006.01)
H04L 12/26 (2006.01)
G06F 11/30 (2006.01)

(52) U.S. Cl.
CPC .......... *H04L 43/0817* (2013.01); *G06F 11/302* (2013.01)

(58) Field of Classification Search
CPC . H04L 43/08; H04L 43/0817; H04L 43/0876; H04L 67/22; G06F 11/302; G06F 11/30
See application file for complete search history.

(56) References Cited

U.S. PATENT DOCUMENTS

| | | | |
|---|---|---|---|
| 5,758,062 A | 5/1998 | McMahon et al. | |
| 5,768,588 A | 6/1998 | Endicott et al. | |
| 5,774,583 A | 6/1998 | Sasaki et al. | |
| 5,805,785 A | 9/1998 | Dias et al. | |
| 6,115,040 A | 9/2000 | Bladow | |
| 6,253,366 B1 | 6/2001 | Mutschler, III | |
| 6,434,598 B1 | 8/2002 | Gish | |
| 6,457,064 B1 | 9/2002 | Huff et al. | |
| 6,563,441 B1 | 5/2003 | Gold | |
| 6,665,677 B1 | 12/2003 | Wotring et al. | |
| 6,684,222 B1 | 1/2004 | Cornelius et al. | |
| 6,691,302 B1 | 2/2004 | Skrzynski et al. | |
| 6,697,363 B1 | 2/2004 | Carr | |
| 6,775,822 B1 | 8/2004 | Apte et al. | |
| 6,804,773 B1 | 10/2004 | Grigsby et al. | |
| 6,832,219 B2 | 12/2004 | Lal | |
| 6,917,620 B1 | 7/2005 | Sindhu et al. | |
| 6,925,631 B2 | 8/2005 | Golden | |

(Continued)

OTHER PUBLICATIONS

The Design and Applications of a Context Service, Lei et al. Oct. 2002, ACM, p. 45-55.

(Continued)

*Primary Examiner* — Jason Recek
(74) *Attorney, Agent, or Firm* — Workman Nydegger

(57) ABSTRACT

Methods and systems for measuring the usage of a runtime engine that supports the software platform of a software or integration application. The method comprises identifying a software or integration application that is componentized into a plurality of units of work, wherein the units of work are based on an abstract runtime unit of work processed by the runtime engine, receiving a request from the software or integration application for the runtime engine to perform a particular unit of work for the supported software or integration application, performing the particular unit of work in response to the request, incrementing a count for the particular unit of work performed in response to the request from the software or integration application to define a usage for the particular unit of work, and displaying the usage for the particular unit of work.

33 Claims, 4 Drawing Sheets

(56) References Cited

U.S. PATENT DOCUMENTS

| | | | |
|---|---|---|---|
| 6,934,712 | B2 | 8/2005 | Kiernan et al. |
| 6,985,939 | B2 | 1/2006 | Fletcher et al. |
| 6,996,589 | B1 | 2/2006 | Jayaram et al. |
| 7,035,944 | B2 | 4/2006 | Fletcher et al. |
| 7,047,243 | B2 | 5/2006 | Cabrera et al. |
| 7,111,197 | B2 | 9/2006 | Kingsbury et al. |
| 7,159,185 | B1 | 1/2007 | Vedula et al. |
| 7,171,672 | B2 | 1/2007 | Just |
| 7,178,050 | B2 | 2/2007 | Fung et al. |
| 7,188,155 | B2 | 3/2007 | Flurry et al. |
| 7,194,485 | B2 | 3/2007 | Kaipa et al. |
| 7,783,745 | B1 * | 8/2010 | Bhargava et al. ............. 709/224 |
| 8,005,950 | B1 * | 8/2011 | Ashcraft et al. ............... 709/224 |
| 8,250,525 | B2 * | 8/2012 | Khatutsky .................... 717/111 |
| 2001/0052108 | A1 | 12/2001 | Bowman-Amuah |
| 2002/0052939 | A1 | 5/2002 | Lee |
| 2002/0169889 | A1 | 11/2002 | Yang et al. |
| 2002/0194244 | A1 | 12/2002 | Raventos |
| 2003/0014500 | A1 | 1/2003 | Schleiss et al. |
| 2003/0120782 | A1 | 6/2003 | Bortoloso et al. |
| 2003/0217033 | A1 | 11/2003 | Sandler et al. |
| 2003/0233602 | A1 | 12/2003 | Lindquist et al. |
| 2004/0003029 | A1 | 1/2004 | Islam et al. |
| 2004/0010473 | A1 * | 1/2004 | Hsu et al. ........................ 705/77 |
| 2004/0015564 | A1 | 1/2004 | Williams |
| 2004/0015578 | A1 | 1/2004 | Karakashian et al. |
| 2004/0064503 | A1 | 4/2004 | Karakashian et al. |
| 2004/0143836 | A1 | 7/2004 | McCormack et al. |
| 2004/0177335 | A1 | 9/2004 | Beisiegel et al. |
| 2004/0183838 | A1 | 9/2004 | Lahiri et al. |
| 2004/0239674 | A1 | 12/2004 | Ewald et al. |
| 2004/0243915 | A1 | 12/2004 | Doyle et al. |
| 2005/0015491 | A1 | 1/2005 | Koeppel |
| 2005/0015643 | A1 | 1/2005 | Davis et al. |
| 2005/0044197 | A1 | 2/2005 | Lai |
| 2005/0050526 | A1 | 3/2005 | Dahne-Steuber et al. |
| 2005/0182779 | A1 | 8/2005 | Perry et al. |
| 2006/0155555 | A1 * | 7/2006 | Barsness et al. .................. 705/1 |
| 2007/0124730 | A1 * | 5/2007 | Pytel ............................. 718/100 |
| 2007/0129146 | A1 * | 6/2007 | Tzruya et al. .................... 463/42 |
| 2007/0150894 | A1 * | 6/2007 | Barsness et al. ............... 718/100 |
| 2007/0168996 | A1 * | 7/2007 | Klein ............................. 717/129 |
| 2007/0299789 | A1 * | 12/2007 | Young ............................ 705/400 |
| 2008/0004841 | A1 * | 1/2008 | Nakamura ..................... 702/186 |
| 2008/0028020 | A1 * | 1/2008 | Bou-Ghannam et al. ...... 709/203 |
| 2008/0134181 | A1 * | 6/2008 | Herbeck et al. ............... 718/100 |
| 2008/0140615 | A1 * | 6/2008 | Zurek et al. ....................... 707/2 |
| 2008/0189696 | A1 * | 8/2008 | De Sutter et al. ............. 717/168 |
| 2009/0049443 | A1 * | 2/2009 | Powers et al. ................. 718/100 |

OTHER PUBLICATIONS

Quality Driven Web Services Composition, Zeng et al. May 2003, ACM, p. 411-421.

Service Oriented Programming, from Wikipedia, the free encyclopedia. [online] 8 pages, retrieved from the Internet Jan. 22, 2009 http://en.wikipedia.org/wiki/Service_Oriented_Programming.

David C. Fallside, XLM Schema Part 0: Primer, W3C Recommendations, May 2, 2001 Published by W3C, 2001, p. 1-74.

Paul V. Biron, XLM Schema Part 2: Datatypes, W3C Recommendations, May 2, 2001 Published by W3C, 2001, p. 1-146.

Yang et al. "Realizing Fault Resilience in Web-Server Cluster", Nov. 2000, IEEE, p. 1-15.

Ahumada, et al. Specifying Fractal and GCM Conponents with UML, Chilean Society of Computer Science, 2008, SCCC 07, XX, Nov. 8-9, 2007, pp. 53-63.

Sun Microsystems, Web Service Made Easier—The Java APIs and Architectures for XML, A Technical Paper White Paper, Published by Sun Microsystems, Inc. Jun. 2002 Revision 3, pp. 1-33.

* cited by examiner

ACCOUNTING FOR USAGE AND USAGE-BASED PRICING OF RUNTIME ENGINE

CROSS-REFERENCE TO RELATED APPLICATIONS

The present application claims priority to and benefit from the U.S. Provisional Patent Application No. 61/023,189 filed Jan. 24, 2008, the entirety of which is herein incorporated by reference.

BACKGROUND OF THE INVENTION

1. The Field of the Invention

The present invention relates to the field of computer programming, software development, deployment, control and management. More particularly, the present invention relates to the usage-based accounting, usage-based pricing, and licensing of any runtime engine that supports the design-time and/or runtime of any software solution such as, but not limited to, business application software, integration software, software modules and software services.

2. The Relevant Technology

Other than open-source licensing models, the most typical licensing model and pricing for software middleware platforms such as application server platforms, integration server platforms, enterprise service bus platforms and in general any "software platform" that supports the runtime and/or design-time of other application software, is the perpetual CPU-based model (including its core-based variation). In this typical CPU (or core) based model, a perpetual license for a software platform is acquired by a licensee from a vendor based on the number of CPU's (or cores) of the computer server that the software platform is installed and operating on. Another licensing and pricing model less often used by vendors, commonly known as the utility computing model, is based on the CPU time spent running an application as a measure of usage. One disadvantage of this model is that the processing speed and other characteristics of the underlying software and hardware may impact the CPU time spent running the application, and consequently, the price of the software. In either pricing model, the mere existence of a software platform on a device or the time spent running a particular software solution is not a direct or accurate measure of the amount of work supported by the software platform.

Other licensing and pricing models known in the art for pricing and licensing application software by software application vendors include user-based models which are based on the number of end-users using the applications, business transaction-based models which are based on specific business transactions supported by the software, and monthly subscription-based models. These methods are rarely used for pricing and licensing software platforms, such as middleware software.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF THE INVENTION

These and other limitations are overcome by embodiments of the invention which relate to systems and methods for measuring usage (i.e., the amount of work performed by) of a runtime engine that supports the software platform of a software or integration application for the same or another computing device. One embodiment of the invention allows the usage to be determined in the form of monetization.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

A first aspect of the invention is a method of measuring the usage of a runtime engine in a computer network or standalone computer, where the runtime engine supports the software platform of a software or integration application. The method comprises identifying a software or integration application that is componentized into a plurality of units of work, wherein the units of work are based on an abstract runtime unit of work that is processed by the runtime engine, receiving a request from the software or integration application for the runtime engine to perform a particular unit of work for the supported software or integration application, performing the particular unit of work in response to the request, incrementing a count for the particular unit of work performed in response to the request from the software or integration application to define a usage for the particular unit of work, and displaying the usage for the particular unit of work A second aspect of the invention is a method of measuring the usage of a runtime engine of a computer network or standalone computer that supports the software platform of a software or integration application. The method comprises identifying a software or integration application that is componentized into a plurality of units of work, wherein the units of work are based on an abstract runtime unit of work that is processed by the runtime engine, assigning a cost value to each unit of work, receiving a request from the software or integration application for the runtime engine to perform a particular unit of work for the supported software or integration application, performing the particular unit of work in response to the request, determining the value of the particular unit of work performed in response to the request from the software or integration application to define a usage for the particular unit of work based on the cost value assigned to the particular unit of work, and requesting payment for the value of the particular unit of work.

A third aspect of the invention is a system that measures the usage of a computer network or standalone computer that supports the software platform of a software or integration application. The system comprises a runtime engine that supports the software platform of a plurality of software or integration applications componentized into a plurality of units of work based on an abstract runtime unit of work processed by the runtime engine by performing the particular unit of work in response to a request from the software or integration applications, and a monitoring module that increments a count for the particular unit of work performed by the runtime engine in response to the request from the software or integration application to define a usage for the particular unit of work and displaying the usage for the particular unit of work.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
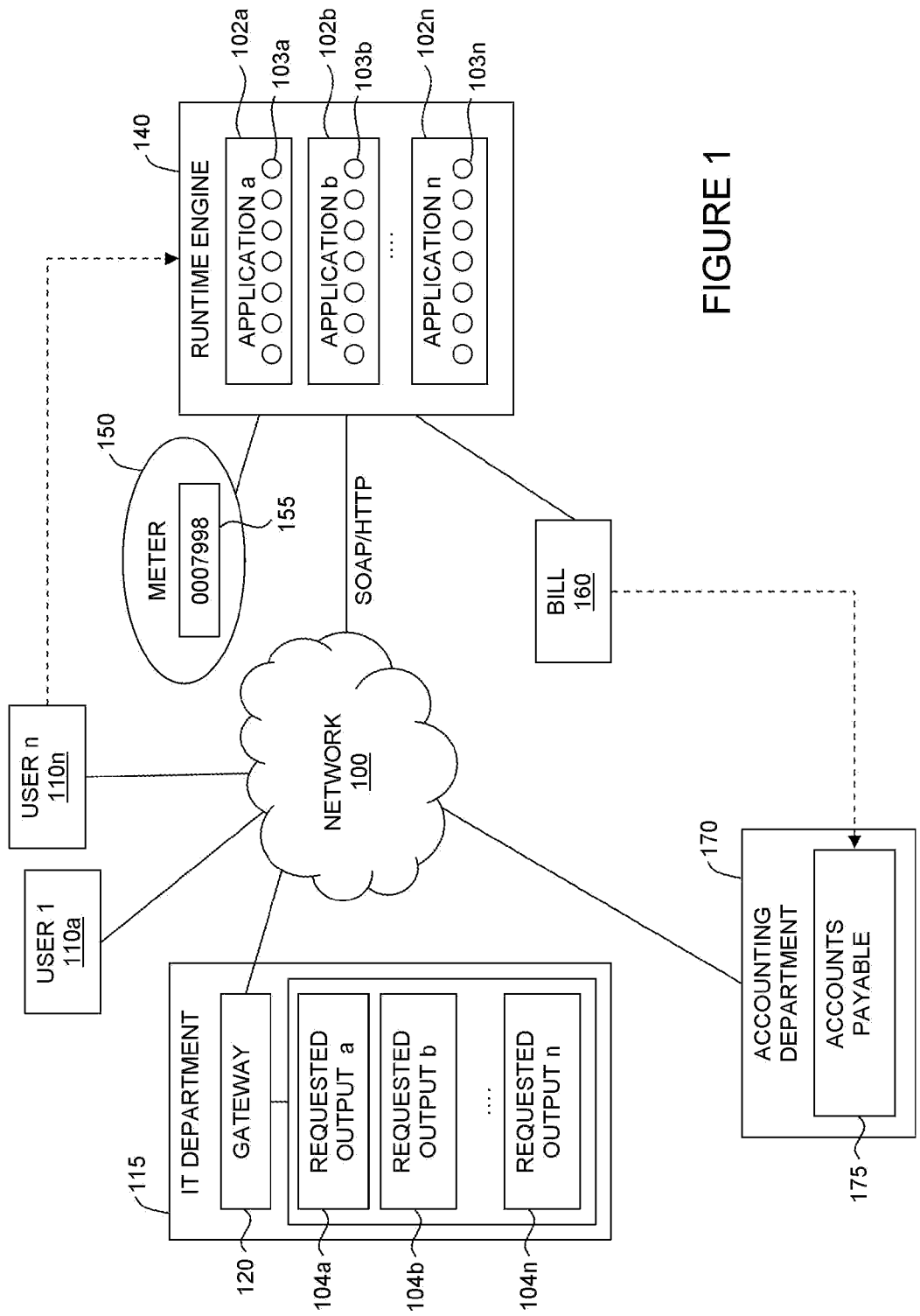
FIG. 1 illustrates an exemplary environment for performing aspects of the invention.

Embodiments of the invention relate to systems and methods for efficiently and accurately measuring the runtime usage of a runtime engine that supports running applications and/or integration software. By measuring the runtime usage of the runtime engine, it is possible to devise and support new utility based and pay-per-usage licensing and pricing models. Thus, aspects of the invention also provide a method for pricing and licensing a software platform by measuring the performance of the underlying runtime engine.

Currently, there is no usage based accounting system for middleware type software platforms that is directly tied into a componentization technique and the abstract runtime unit of work supported by a software platform. The present invention utilizes the ability to be able to componentize a software platform and then define an abstract unit of work supported by the software platform. For example, in a software platform based on a procedural programming paradigm, the componentization technique is based on procedure definitions and the related abstract runtime unit of work is based on procedure calls. In another example based on an object oriented programming paradigm, the componentization technique is based on class and method definitions and the related abstract runtime unit of work is based on object creation and method calls. Another componentization technique which is implemented in a Service Oriented Programming paradigm, where atomic or composite services (composed of nested atomic services) have defined interfaces and are able to express application and/or integration logic, has a componentization technique based on program module being defined as software services and the related abstract runtime unit of work is based on service consumption, such as invocation or execution of a service. In one preferred embodiment, the usage is directly used as measures of licensing and pricing for the underlying software platform that is enabling the application and/or integration software. Those of skill in the art will appreciate that based on the teaching herein that the usage model can be applied to any software platform that is defined using a componentization technique and an abstract runtime unit of work.

Because usage is based on a componentization technique and an abstract runtime unit of work, the present invention can provide a usage model for measuring the usage of a runtime engine regardless of the specific applications and integration solutions running on the runtime engine.

The usage-based pricing model can be applied to a hosted runtime engine where software infrastructure usage, itself, is provided as a service, herein referred to as a "Software Infrastructure as a Service" model, as well as a non-hosted runtime engine where the runtime engine is installed on-premises at end-consumer sites.

Further, present invention can provide a new extensible usage model that can apply to software applications and solutions provided under what is commonly known as "Software as a Service" or "SaaS" and a new licensing and pricing model for the use of software modules, rather than licensing and pricing of a whole software application as currently used in "Software Components as Services" models.

FIG. 1 illustrates an exemplary system and computing environment that performs aspects of the invention. The environment includes a network 100 communicating with a number of user clients 110a-n. The terms "client" and "user" may be used interchangeably to refer to the fact that any number of users may access the network 100 via clients 110a-110n. An IT department 115 associated with the clients 110a-110n provides a gateway 120 by which each client 110a-110n may access applications 102a-102n which are being supported by a runtime engine 140. More specifically, each client 110a-110n requests output 104a-104n from the applications 102a-102n operating in the runtime engine 140. In this particular embodiment, applications 102a-102n are provided in a "Software as a Service" configuration in which the client 110a-110n is able to generate the requested output 104a-104n of the applications 102a-102n which are hosted and executed by the runtime engine 140, but available to the clients 110a-110n via the gateway 120 of the IT Department 115.

As may be understood by one of ordinary skill in the art, one advantage of such a "Software as a Service" or SaaS configuration is that it enables a user to use an application without requiring the client 110a-110n to maintain, operate, and support the application locally. Using this configuration, the IT Department 115 is able to monitor the client 110a-110n usage of the SaaS services provided by the runtime engine 140. As described more fully below, this is particularly useful in configurations where a business or other entity wishes to monitor or limit the cost of using SaaS applications. Using the usage, pricing and/or licensing scheme described more fully below, the runtime engine 140 is able to quantify, monetize, and/or control the runtime units of work 103a-103n that are performed on behalf of the client 110a-110n in order to generate the requested output 104a-104n.

FIG. 1 illustrates that each application 102a-102n is componentized into one or more abstract units of work 103a-103n, respectively. Calling, executing, instantiating, invoking or otherwise requesting the units of work 103a-103n, depending on the software platform, and then processing the units of work based on the request generates the requested output 104a-104n. As may be understood by one of ordinary skill in the art, the requested output 104a-104n may involve requesting and/or performing a plurality of units of work 103a-103n in a variety of applications 102a-102n supported by the runtime engine 140. Alternatively, a single unit of work 103a-103n may generate a single requested output 104a that may be distributed to more than one client 110a-110n of the system.

The client 110a-110n may be, for example, a personal computer, cellular phone, personal computing device, or any other computing machine. A suitable computer system may include a processor, a storage device, a monitor, or other graphical device, a keyboard, a mouse, or other input device, connection software including support for TCP/IP, HTTP/

SOAP or any proprietary or standard remote communication protocol, and browser software. The network 100 may be any local or global computer network, including the Internet, local area network, or combination thereof.

Using the method described more fully below, a runtime engine 140, also referred to as a virtual machine, is used to intercept the request of application components 103a-103n sent to the client 110a from the software applications 102a-102n if runtime components are supported by the underlying programming paradigm, and to intercept the unit of runtime work associated with the underlying application program 102a-102n. To accomplish this, the application 102a-102n is operated through the runtime engine 140 such that the runtime engine 140 controls the operation of the application 102a-102n and thus directly or indirectly controls the program counter and the address space of the application 102a-102n. In this way, the runtime engine 140 operates as a layer for requesting components, if any, and dispatching the abstract unit of work associated with the application 102a-102n.

Figure 2:
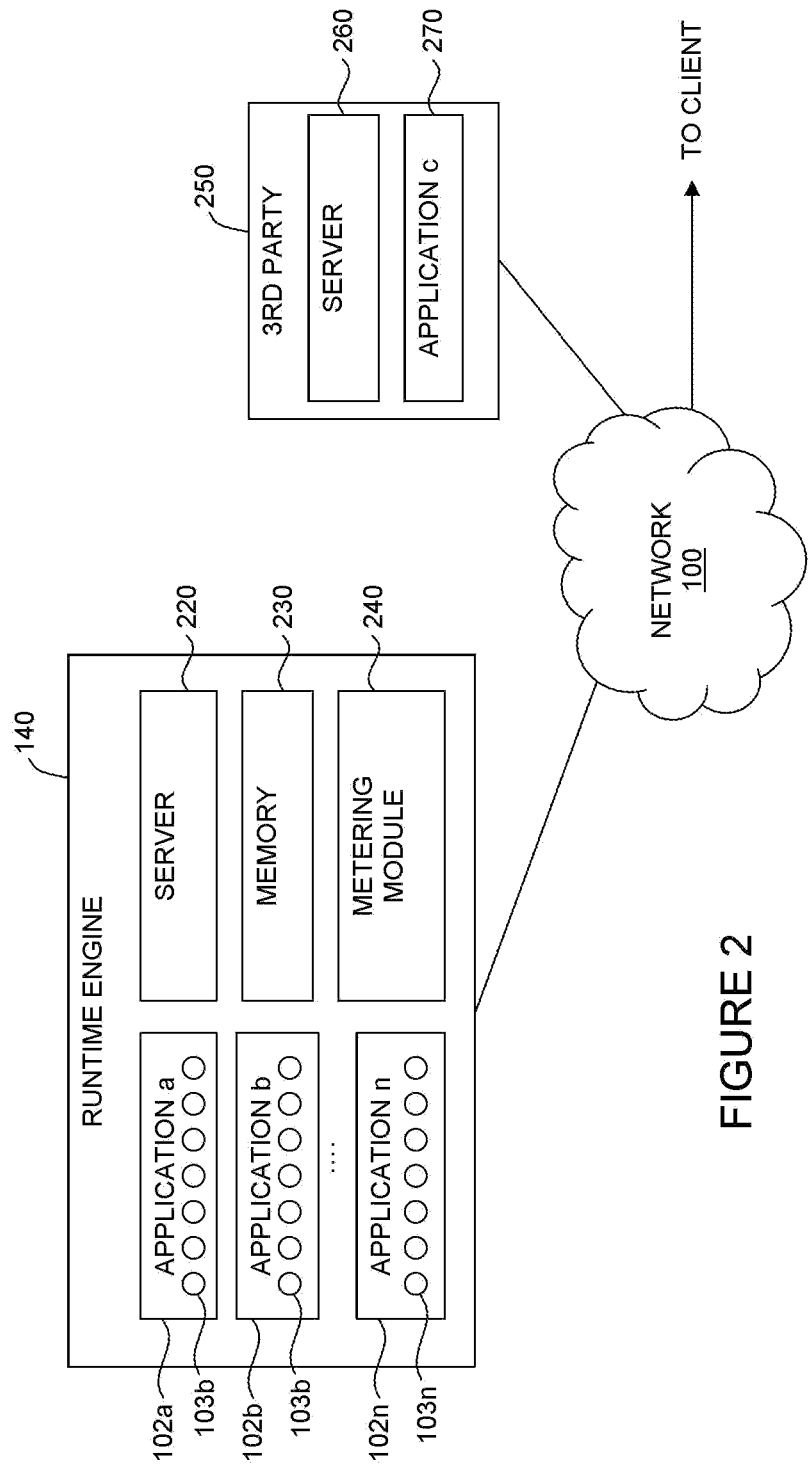
FIG. 2 illustrates an exemplary runtime engine for performing aspects of the invention.

As shown in FIG. 2, in addition to the applications 102a-102n and a metering module 240 where the client's 110a-110n usage is recorded, the runtime engine 140 may also contain memory address space 230 which may be utilized by the application program 102a-102n. As may be understood by one of ordinary skill in the art, the configuration is exemplary only and the runtime engine 140 may also include an optionally multi-function, general purpose middleware platform such as integration and application server 220, a service bus or business process management platform used to support the runtime of software applications 102a-102n or automation solutions.

Furthermore, the runtime engine 140 supports the runtime of applications 270 which are hosted by or located at a third party 250 by sending and receiving a series of communications via the network connection 100 to a server 260 of the third party 250. Thus, in one embodiment of the invention the software 270c need not reside locally on the runtime engine 140. Although not shown, application 270 may also be componentized into abstract units of work, similar to that shown for applications 102a-102n.

Returning to FIG. 1, by using the runtime engine 140 to operate the applications 102a-102n, the runtime engine 140 monitors the client's usage of the applications 102a-102n. In one embodiment, by monitoring this usage, the runtime engine 140 can charge the client 110a-110n a price or licensing fee based on their use of the applications 102a-102n. In one embodiment, the client's usage may be reflected in a meter 150, which includes a count or measurement 155 indicating the amount of unit runtime, number of requests, or number of requested outputs 104a-104n performed by the runtime engine 140 on behalf of the clients 110a-110n. Using this measurement, the runtime engine 140 may generate a bill 160 which is sent to the accounts payable 175 account of the accounting department 170 of the entity associated with the clients 110a-110n.

Thus, one aspect of the present invention is the ability to measure and monetize the amount of work generated by a client 110a-110n using, for example, a SaaS platform 140. By operating the applications 102a-102n in a runtime engine 140, the system described herein is able to standardize the amount of work actually generated by the client 110a-110n, regardless of the specific configuration of the client device 110a-110n.

As may be recognized by one of ordinary skill in the art, the distributed environment shown in FIG. 1 is depicted by way of example only, and one of skill in the art would understand that any number of system configurations may be used in accordance with the present invention. For example, in another configuration, a user or client may connect via a client 110n to the runtime engine 140 directly, without connecting to an IT Department 115. In this configuration, the runtime engine 140 would send the communications directly to the client 110n and create an arrangement for the payment by a user of client 110n for the unit of work or requests by the runtime engine 140 on behalf of the client 110n.

Figure 3:
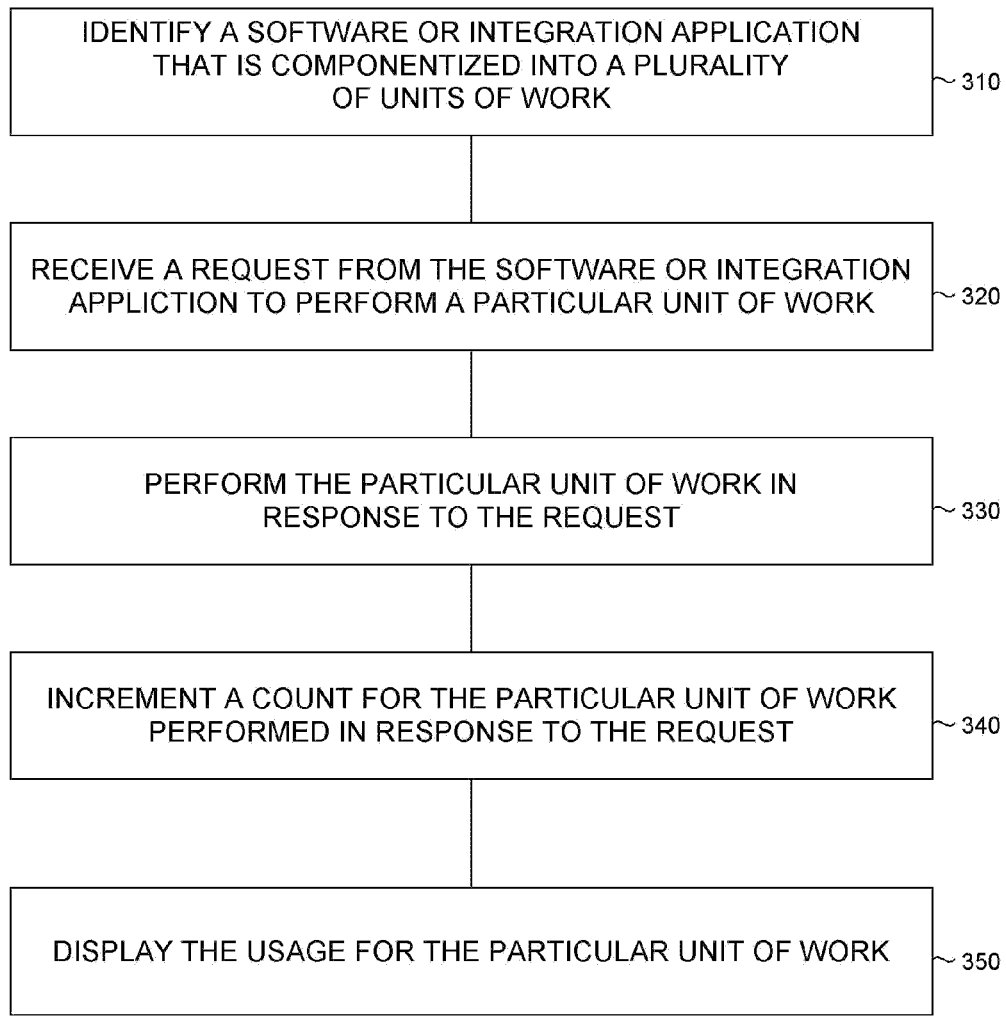
FIG. 3 is a block diagram illustrating a method of the invention for measuring the usage of a runtime engine.

FIG. 3 illustrates a method of the present invention for measuring the amount of work performed by the runtime engine 140 on behalf of the clients 110a-110n. As shown in FIG. 3, the method begins with the identification 310 of a software or integration application that is componentized into a plurality of units of work. As described below, the software or integration application can be componentized in a variety of ways, depending on the specific configuration of the underlying application. For example, some applications may be componentized by identifying individual units of runtime work that are performed by the applications by making procedural calls, while other applications may be componentized by number of objects that are instantiated in response to a user request, while still others are componentized into discrete atomic or composite services and executed using service invocations. Thus, depending on the specific configuration of the runtime engine 140 and the specific type of software and integration applications 102a-102n supported by the runtime engine 140, a unit of work may be defined in a variety of ways. As described below, a unit of work may comprise a service invocation in a service-oriented configuration, procedural calls in a procedural programming paradigm, or alternately, may comprise an instantiation of an object in an object-oriented configuration.

Once a software or integration application has been componentized, the runtime engine 140 receives 320 a request from the componentized software application 102a-102n to perform a particular unit of work on behalf of a client 110a-110n. In response to the request, the unit of work is performed 330 by the application 102a-102n operating in the runtime engine 140. Once the unit of work is performed, the runtime engine 140 sends a communication to a metering module 240 indicating that a unit of work was performed on behalf of the requesting client 110a-110n. As described more fully below, the runtime engine 140 may perform a requested service that involves performing a number of units of work, and may wait until all units of work are performed before reporting to the metering module 240. Then, the metering module 240 receives 330 the number of units of work performed in response to the client 110a-110n request and increments 340 a count for the amount of work performed on behalf of the client 110a-110n. Finally, the usage is displayed 350 to the client 110a-110n.

Figure 4:
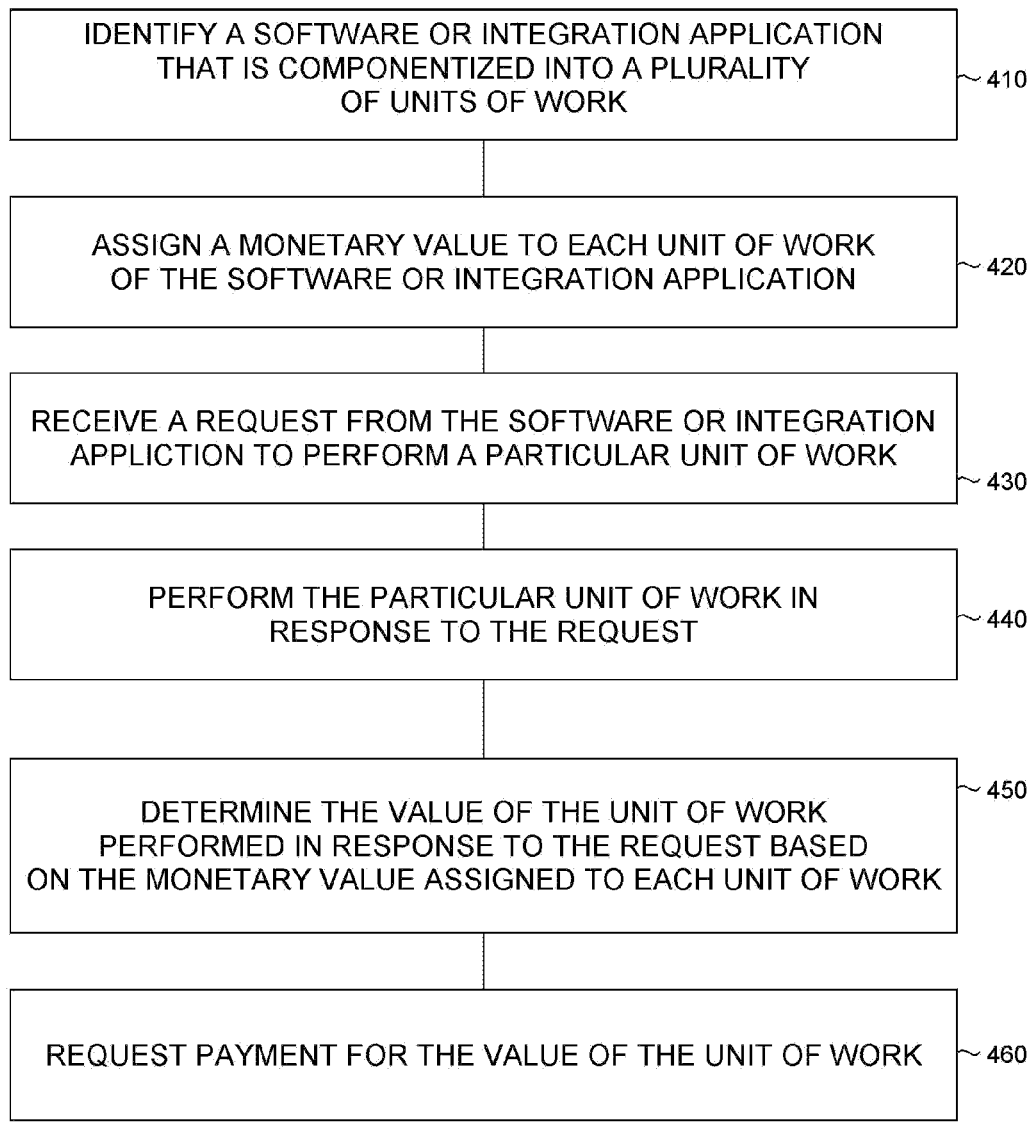
FIG. 4 is a block diagram illustrating a second method of the invention for measuring the value of the usage of the runtime engine.

FIG. 4 is a block diagram illustrating a second method of the invention, wherein the usage performed by the runtime engine 140 is assigned a value, which may subsequently be used to determine a cost or licensing price for using the runtime engine 140. First, similar to the method described in FIG. 3, based on the specific configuration of the runtime engine 140 and the componentization of applications 102a-102n supported by the runtime engine 140, a software or integration application is identified 410 that is componentized into a plurality of units of work. Then, a monetary value is assigned 420 to the componentized units of work that may be supported by the runtime engine 140. As previously described, a unit of work may comprise an request to process a component, a particular quantity of runtime, or the like. As may be understood by one of ordinary skill in the art, assigning a monetary value to the componentized units of work may involve any number of methods, including, but not limited to assigning specific units of work to different categories of price or value according to a predetermined value system. Using this system, the runtime engine 140 may assign different values to the use of different applications 102a-102n or the use of different units of work 103a-103n (e.g., procedural calls, objects, services) performed by the different applications 102a-102n.

Then, similar to the method described in FIG. 3, the runtime engine 140 receives 430 a request from to the software or integration application 102a-102n to perform a unit of work 103a-103n in a supported application 102a-102n on behalf of a client 110a-110n. In response to the request, the unit of work is performed 440 by the application 102a-102n operating in the runtime engine 140. Once the unit of work is performed, the runtime engine 140 sends a communication to a metering module 240 indicating that a unit of work 103a-103n was performed in response to the request by the application 102a-102n on behalf of the client 110a-110n.

Based on the reporting communication from the runtime engine 140, the metering module 240 determines 450 the value of the unit of work 103a-103n performed in response to the request based on the monetary value assigned to the unit of work. Then, using the value of the unit of work previously assigned at 410, the metering module 240 determines the price, cost, or value of the work performed by the runtime engine 140 on behalf of the client 110a-110n. As described more fully below, the metering module 240 may perform an accounting operation in order to collect the value of the work performed by the runtime engine 140, including requesting 460 payment for the value of the unit of work.

As described above, in one embodiment, each time a component or particular type of component is requested and/or processed, the runtime engine 140 records the event and dispatches the request of the component in the memory 230 as an instance of usage of the software application 102a-102n. Alternatively, depending on the specific configuration of the software application 102a-102n and the functions supported by the applications 102a-102n, the amount of work performed by the application 102a-102n may be captured as units of work dispatched through the runtime engine 140. Hereon, the recording act of capturing the request and/or processing of amounts of work performed by the runtime engine 140 is referred to as "usage metering" or "metering." Furthermore, the record of the number of requests or amount of work performed stored in the metering module 240 is referred to as "metered usage."

In order to ensure better performance and to reduce the number of I/O communications transmitted in the runtime engine 140, the usage metering may be transmitted to the metering module 240 in batches based on configurable intervals, rather than transmitting a communication each time a unit of work is requested by the client 110a-110n. Furthermore, the meter 150 may contain as little information as the overall number of unit of works dispatched and the overall number of components requested, if any, or may be designed to contain more detailed information such as the number of times an instance of a particular named component is requested or the number of times a particular named unit of work is dispatched as well as the exact time of dispatch, the duration for the execution of dispatched unit of work, or other more specific information.

In one embodiment, the average number of dispatched units of work per second is measured and used as a measure of performance for the runtime engine 140. The value of this measure of performance is that it may be used to generate the pricing and licensing model. For example, in a runtime engine 140 supporting a service oriented programming paradigm, the measure of performance will be expressed as the average number of Service Invocations Per Second (SIPS) for a benchmark application. Hence, the licensing or price of using the runtime engine 140 can be based on the cost of operating the runtime engine 140 versus the number of SIPS that the runtime engine 140 is expected to perform for an average client 110a-110n of the system.

Based on the method of the present invention a fixed or variable cost is then assigned to the act of dispatching a unit of work and/or requesting a component of the underlying programming paradigm, for example through the use of an XML configuration file, regardless of the type of component or dispatched unit of work, in order to create a pay-per-usage pricing or licensing model which reflects the amount of work supported by the underlying programming paradigm. The variability of the cost associated to the unit of work may be based on time-of-day, pre-packaged number of included dispatches/requests, or the like, with extra charges being applied for overages or other factors similar to the pricing and licensing models currently used by telecommunication companies in the pricing of cell phone minutes.

By multiplying the cost associated to a unit of work dispatch and/or component requests and the number of metered dispatch and/or component requests, the overall cost of the platform usage can be determined under a licensing agreement based on this kind of usage. Then, the licensee can be charged for its use of the underlying runtime engine 140. In addition, by metering a client's 110a-110n usage and associating the meter with particular user information associated with each individual client 110a-110n, a bill 160 may be sent to an entity or accounting department 170 which identifies which client 110a-110n of the entity used the runtime engine 140. This may also be used in a multi-tenant environment, so that a client 110a-110n of the tenant may be charged separately based on the usage of a specific user 110a-110n.

Thus, another aspect of the present invention provides multi-tenant and user-based metering and metered usage. To accomplish this, the metering module 240 of the runtime engine 140, may be integrated with a user and account-based provisioning system so that a particular client 110a-110n may be associated with a client identifier, if any. Using the client identifier and the meter 150 stored within the metering module 240, the client identifier may be coupled with the client's 110a-110n usage as reflected in the meter 150, and stored as part of the usage metering performed by the metering module 240.

In yet another aspect of the present invention, a fixed or variable cost can be assigned to each abstract unit of work, or to a particular type of unit of work. For example, a price may be assigned for instantiating a particular object or executing a particular named method in an object-oriented application 102a-102n. Alternatively, in applications 102a-102n where a procedural platform in a procedural platform paradigm is used, a price may be assigned to a particular procedure or function calls initiated by the applications 102a-102n. Further, in addition to the platform usage cost, an additional price may be charged for the application value provided by the abstract unit of work performed by the runtime engine 140. These are just some examples that will become readily apparent once the teachings of the present invention are understood.

Furthermore, a portion of the cost may be determined by the provider of the application 102a-102n. Thus, one component of the overall cost may include the basic cost of performing units of work using the runtime engine 140, with a separate additional component of the cost being attributed to the cost for performing particular a unit of work, such as a particular service, or procedure or method or class, depending on the application 102*a*-102*n*. Thus, there may be a component of the overall cost applied for being able to use the basic runtime engine infrastructure, including components of the runtime engine 140, with a separate additional component of the overall cost being determined by the price of using the application 102*a*-102*n* itself. Thus, using this embodiment, the costs may be used to support a similar pay per usage model for specific applications 102*a*-102*n* built on top of the runtime engine 140.

In another aspect of the present invention, an optionally multi-client runtime engine 140 that can support a hosted pay-as-you-go pricing model, which may be provided through a public network such as internet. Alternatively, the runtime engine 140 may be provided in a private network, where the clients 110*a*-110*n* of the runtime engine 140 license the use of the runtime engine 140 and pay for the use of the runtime engine 140 and the computing device operating the runtime engine 140 based on the pricing model described herein. Each client 110*a*-110*n* may be provided with a portal or gateway 120 for acquiring information about their usage. Furthermore, the clients 110*a*-110*n* may elect one of the pre-packaged levels of usage which are offered as different levels of subscription, similar to the mobile phone subscription packages where a number of dispatched units of work is used in the present configuration instead of the number of "minutes" which are typically used in the mobile telecommunication pricing model. One benefit of this configuration is a convergence of the software industry and telecommunication business models.

In one embodiment, the runtime engine 140 comprises a service-oriented programming platform ("SOP"), where a service application can be licensed and priced on the pay per usage model enabled by the present invention. In this embodiment, the abstract unit of work which serves as the metric for the pricing and licensing model is the consumption/execution/invocation of a service and the unit of work measured by the runtime engine 140 is defined as each instance when a service invocation is consumed (or executed or invoked) by the runtime engine 140 supporting the service-oriented application 102*a*-102*n*.

Furthermore, in the hierarchical service composition technique enabled by SOP, when a composite service is implemented (composite referring to having one or more nested composite or atomic services), the composite service is invoked by the runtime engine 140. In this embodiment, each time a nested composite or atomic service is invoked or consumed, regardless of the depth of occurrence within the composite hierarchy or the particular application purpose of the consumed service, the number of dispatched/consumed services reflected by the meter 150 is incremented for each nested composite or atomic service. Thus, a single composite service may actually result in multiple usage counts by having nested composite or atomic services. Thus, in this embodiment, all multi-client, remote metering, fixed or variable pricing, and metering of separate costs of each individual application 102*a*-102*n* as well as the runtime platform value of the service invocation, and other aspects of the present invention can be tracked by a metering module 240 within the runtime engine 140.

In this embodiment, the metering module 240 tracks the number of service invocations and thus reflects the total number of Service Invocations Metered (SIM). By devising a licensing agreement where the user agrees to use the runtime engine 140 to build an application or system software in return for paying for the cost of SIM based on an assigned fixed or variable cost scheme per service invocation, the pay per usage licensing and charge model enabled by the present invention can be deployed. SIM may be used as a universal unit of usage, licensing, and price, using the pay per usage model for service oriented utility computing platforms using the system and methods described herein.

In yet another embodiment, the runtime engine 140 supports an Object Oriented Programming, or "OOP" paradigm. In this embodiment, the metering metric used by the runtime engine 140 and metering module 240 is based on Class definitions with the unit of work comprising a method call at runtime and the act of dispatching a method call and instantiating objects. More specifically, the method calls alone can be used to charge for the usage of the runtime engine 140, or the object instantiation can be used, or both can be measured by the metering module 240 and used to determine the use and subsequently the price for using the runtime engine 140.

Similar to the other embodiments described above, in this configuration, the runtime engine 140 supports a multi-client, remote metering, fixed or variable pricing system, with a separate cost being associated to particular application objects and methods as well as the runtime platform value of the method call and/or object instantiation.

In still another embodiment, a runtime engine 140 may be used that supports a Procedural Programming paradigm, such as the paradigm provided by C programming platforms. In this embodiment, use of the runtime engine 140 can be licensed and priced using a pay-per-use model previously described. In this case, the componentization metric is based on the procedure/function definitions with the abstract unit of work being a procedure/function call at runtime. Thus, the act of dispatching a procedure/function call can be measured by the metering module 240. In this embodiment, the number of procedure/function calls made by a client 110*a*-110*n* in a particular session is used to determine the usage and subsequently the pricing for use of the runtime engine 140. Thus, as described above, the runtime engine 140 supports a procedural programming paradigm in a multi-client environment, using remote metering, with a fixed or variable pricing scheme. In this embodiment, a separate cost may be associated with a particular and named application procedure/function and applied in addition to a runtime platform value of the dispatch of the procedure/function call.

Thus, the embodiments described herein provide for a system of monitoring usage, monetizing usage and/or licensing software applications which are hosted by a runtime engine that consistently measures the amount of work generated by a client of the system, regardless of the specific computing configuration of the client device.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer network or standalone computer, a method of measuring usage of a virtual machine that supports a software platform independent of the type of operating system used, the method comprising:
   componentizing a computer application into a plurality of units of work processable by the virtual machine independent of the type of operating system used, each of the units of work being based on an abstract runtime unit of work, the computer application being a software or integration application associated with the software platform;
   receiving a request from a client to perform the computer application,
   in response to the request from the client, operating the computer application through the virtual machine, the virtual machine performing the following as the computer application is operating:
      intercepting a request from the computer application to perform an application component, the application component being equivalent to one or more of the units of work; and
      in response to the intercepted request, performing the equivalent one or more units of work instead of the application component; and
   determining a total usage value based on the one or more performed units of work to reflect a fundamentally non-time based and operating system independent amount of usage of the virtual machine.

2. The method of claim 1, further comprising:
   assigning a user identifier to a user of the computer application; and
   associating the total usage value with the user identifier.

3. The method of claim 1, wherein the request from the client is made on behalf of a user operating a computing device connected to the virtual machine via a network connection.

4. The method of claim 1,
   wherein each of the plurality of units of work comprises an in-process service invocation, and
   wherein determining the total usage value comprises incrementing a count each time one of the equivalent in-process service invocations is performed in response to the intercepted request from the computer application to perform the application component.

5. The method of claim 1,
   wherein each of the plurality of units of work comprises a service invocation, and
   wherein determining the total usage value comprises incrementing a count for each equivalent service invoked in response to the intercepted request from the computer application to perform the application component.

6. The method of claim 1,
   wherein the software platform comprises an object oriented programming platform and each of the plurality of units of work comprises an instantiation of a runtime object or a method call, and
   wherein determining the total usage value comprises incrementing a count for each equivalent runtime object instantiation and method call invoked in response to the intercepted request from the computer application to perform the application component.

7. The method of claim 1,
   wherein the software platform comprises a procedural programming platform and each of the plurality of units of work comprises a procedure or function call, and
   wherein determining the total usage value comprises incrementing a count for each equivalent procedure and function call invoked in response to the intercepted request from the computer application to perform the application component.

8. The method of claim 1, wherein determining the total usage value comprises determining a number of times the equivalent one or more units of work are performed.

9. The method of claim 1, further comprising tracking an aggregate amount of usage of the virtual machine in performing equivalent units of work for the computer application over a period of time.

10. The method of claim 1, further comprising displaying an amount representing the total usage value for the one or more performed units of work.

11. The method of claim 1,
   wherein the request from the client is a request for output relating to the computer application, and
   wherein operating the computer application through the virtual machine generates the requested output.

12. In a computer network or standalone computer, a method of measuring usage of a virtual machine that supports a software platform independent of the type of operating system used, the method comprising:
   componentizing a computer application into a plurality of units of work processable by the virtual machine independent of the type of operating system used, each of the units of work being based on an abstract runtime unit of work, the computer application being a software or integration application associated with the software platform;
assigning a cost value to each unit of work;
receiving a request from a client to perform the computer application;
in response to the request from the client, operating the computer application through the virtual machine, the virtual machine performing the following as the computer application is operating:
  intercepting a request from the computer application to perform an application component, the application component being equivalent to one or more of the units of work; and
  in response to the intercepted request, performing the equivalent one or more units of work instead of the application component; and
determining a total cost value of the one or more performed units of work based on the cost value assigned to each unit of work, the total cost value being operating system independent.

13. The method of claim 12,
wherein assigning the cost value to each unit of work comprises:
  assigning each unit of work to a category of work; and
  assigning a cost value to each category of work; and
wherein determining the total cost value of the one or more performed units of work comprises:
  determining to which category of work each of the one or more performed units of work is assigned;
  for each category of work, aggregating the cost values of all of the one or more performed units of work corresponding to the category of work and multiplying the aggregate cost value corresponding to the category of work by the cost value for the category of work to generate a composite cost value for the category of work; and
  aggregating the composite cost values corresponding to each category of work.

14. The method of claim 13, further comprising displaying the composite cost value for at least one of the categories of work.

15. The method of claim 12, further comprising:
assigning a user identifier to a user of the computer application;
associating the total cost value for the one or more performed units of work with the user identifier; and
requesting payment for the total cost value of the one or more performed units of work from the user assigned to the user identifier.

16. The method of claim 12, wherein the request from the client is made on behalf of a user operating a computing device connected to the virtual machine via a network connection.

17. The method of claim 12,
wherein each of the plurality of units of work comprises an in-process service invocation, and
wherein determining the total cost value comprises incrementing a count each time one of the equivalent in-process service invocations is performed in response to the intercepted request from the computer application to perform the application component.

18. The method of claim 12,
wherein at least one of the one or more performed units of work comprises a service invocation, and
wherein determining the total cost value comprises incrementing a count for each equivalent service invoked in response to the intercepted request from the computer application to perform the application component.

19. The method of claim 12,
wherein the software platform comprises an object oriented programming platform and each of the plurality of units of work comprises an instantiation of a runtime object or a method call, and
wherein determining the total cost value comprises incrementing a count for each equivalent runtime object instantiation and method call invoked in response to the intercepted request from the computer application to perform the application component.

20. The method of claim 12,
wherein the software platform comprises a procedural programming platform and each of the plurality of units of work comprises a procedure or function call, and
wherein determining the total usage value comprises incrementing a count for each equivalent procedure and function call invoked in response to the intercepted request from the computer application to perform the application component.

21. The method of claim 12, further comprising requesting payment for the total cost value of the one or more performed units of work.

22. A system that measures usage of a computer network or standalone computer, the system comprising:
one or more computing devices;
a virtual machine that runs on at least one of the one or more computing devices, the virtual machine supporting a software platform of a plurality of software or integration computer applications componentized into a plurality of units of work processable by the virtual machine independent of the type of operating system used, each unit of work being based on an abstract runtime unit of work, the runtime engine being configured to:
  receive a request from a client to perform a computer application, the computer application being a software or integration application associated with the software platform; and
  in response to the request from the client, operate the computer application and perform the following while operating the computer application:
    intercept a request from the computer application to perform an application component, the application component being equivalent to one or more of the units of work; and
    in response to the intercepted request, perform the equivalent one or more units of work instead of the application component; and
a metering module that runs on at least one of the one or more computing devices, the metering module being configured to determine a total usage value based on the one or more units of work performed by the virtual machine to reflect a fundamentally non-time based and operating system independent amount of usage of the virtual machine.

23. The system of claim 22, further comprising an integration server configured to transmit communications between the plurality of computer applications, and wherein
the virtual machine is configured to perform equivalent units of work corresponding to more than one of the plurality of computer applications in response to the intercepted request from the client to perform the application component.

24. The system of claim 22, wherein the metering module is configured to assign a cost value to each unit of work and determine a total cost value of the one or more performed units of work based on the cost value assigned to each performed unit of work.

25. The system of claim 22, wherein the metering module is configured to assign a user identifier to a user of the computer application and associate the total usage value for the one or more performed units of work with the user identifier.

26. The system of claim 22, wherein the metering module is configured to:
assign each unit of work to a category of work,
assign a cost value to each category of work,
determine to which category of work each of the one or more performed units of work is assigned, and
for each category of work, aggregate the cost values of all of the one or more performed units of work corresponding to the category of work and multiply the aggregate cost value corresponding to the category of work by the cost value for the category of work to generate a composite cost value for the category of work.

27. The method of claim 26, wherein the metering module is configured to display the composite cost value for at least one of the categories of work.

28. The system of claim 22, wherein the metering module is configured to determine the total usage value by determining a number of times the one or more equivalent units of work are performed.

29. The system of claim 28, wherein the metering module is configured to determine the number of times the one or more equivalent units of work are performed by incrementing a count each time any of the one or more equivalent units of work are performed.

30. The system of claim 22, wherein the metering module is configured to track an aggregate amount of usage of the virtual machine in performing the equivalent units of work for the computer application over a period of time.

31. The system of claim 22, wherein the metering module is configured to display an amount representing the total usage value for the one or more performed units of work.

32. A non-transitory computer readable storage medium having stored thereon computer-executable instructions that, when executed, measure usage of a virtual machine that supports a software platform independent of the type of operating system used by performing the following method:
componentizing a computer application into a plurality of units of work processable by the virtual machine independent of the type of operating system used, wherein each of the units of work are based on an abstract runtime unit of work;
receiving a request from a client to perform a computer application that is a software or integration application associated with the software platform;
in response to the request from the client, operating the computer application through the virtual machine, wherein the virtual machine performs the following as the computer application is operating:
intercepting a request from the computer application to perform an application component, the application component being equivalent to one or more of the units of work; and
in response to the intercepted request, performing the equivalent one or more units of work instead of the application component; and
determining a total usage value based on the one or more performed units of work to reflect a fundamentally non-time based and operating system independent amount of usage of the virtual machine.

33. In a computer network or standalone computer, a method of measuring usage of a virtual machine, the virtual machine comprising a service-oriented programming platform, the method comprising:
componentizing a service-oriented computer application into a plurality of units of work processable by the virtual machine independent of the type of operating system used, each unit of work being a consumption or execution or invocation of a service;
receiving a request from a client to perform the service-oriented computer application, the computer application being a software or integration application;
in response to the request from the client, operating the service-oriented computer application through the virtual machine, the virtual machine performing the following as the computer application is operating:
intercepting a request from the computer application to perform a composite service, the composite service comprising one or more nested services, each of the nested services being equivalent to one or more of the units of work; and
in response to the intercepted request, performing the equivalent one or more units of work corresponding to the requested composite service instead of the requested composite service; and
determining a total usage value based on the one or more performed units of work to reflect a fundamentally non-time based and operating system independent amount of usage of the virtual machine.

* * * * *